Aug. 28, 1956 — O. LOCHER — 2,761,054
ELECTRIC COOKER FOR LARGE KITCHENS
Filed Dec. 24, 1953 — 6 Sheets-Sheet 1
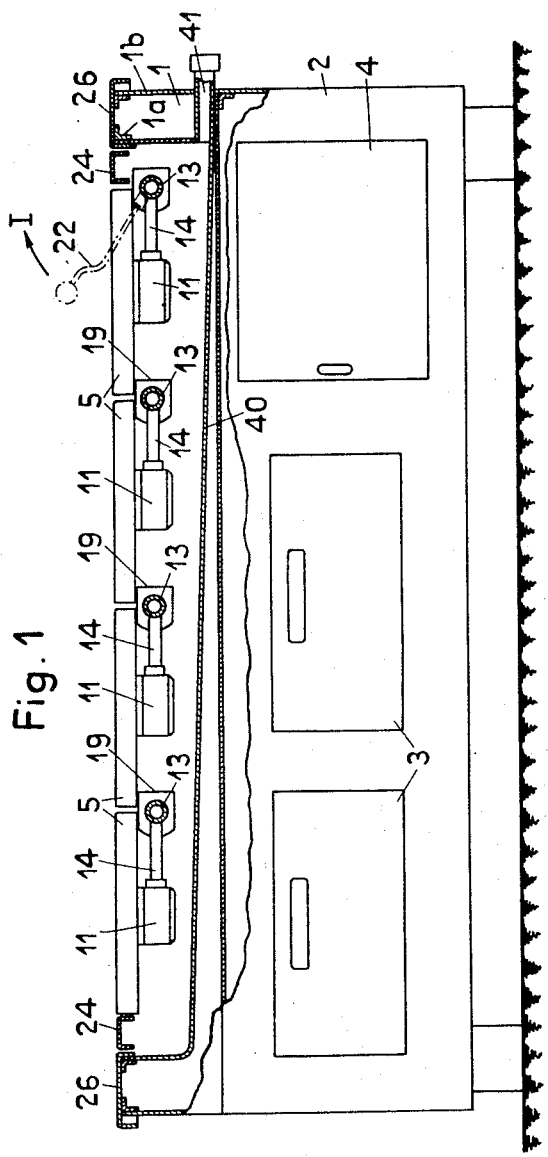
INVENTOR
OSKAR LOCHER
Greene, Pindler & Durr
ATTORNEYS

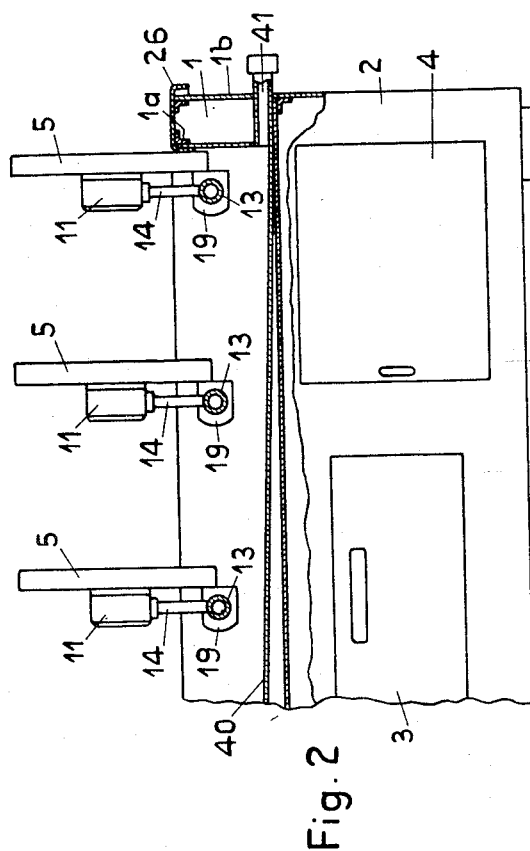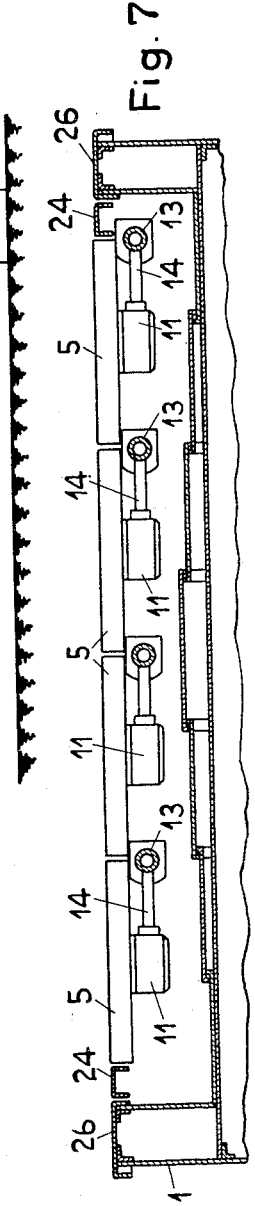

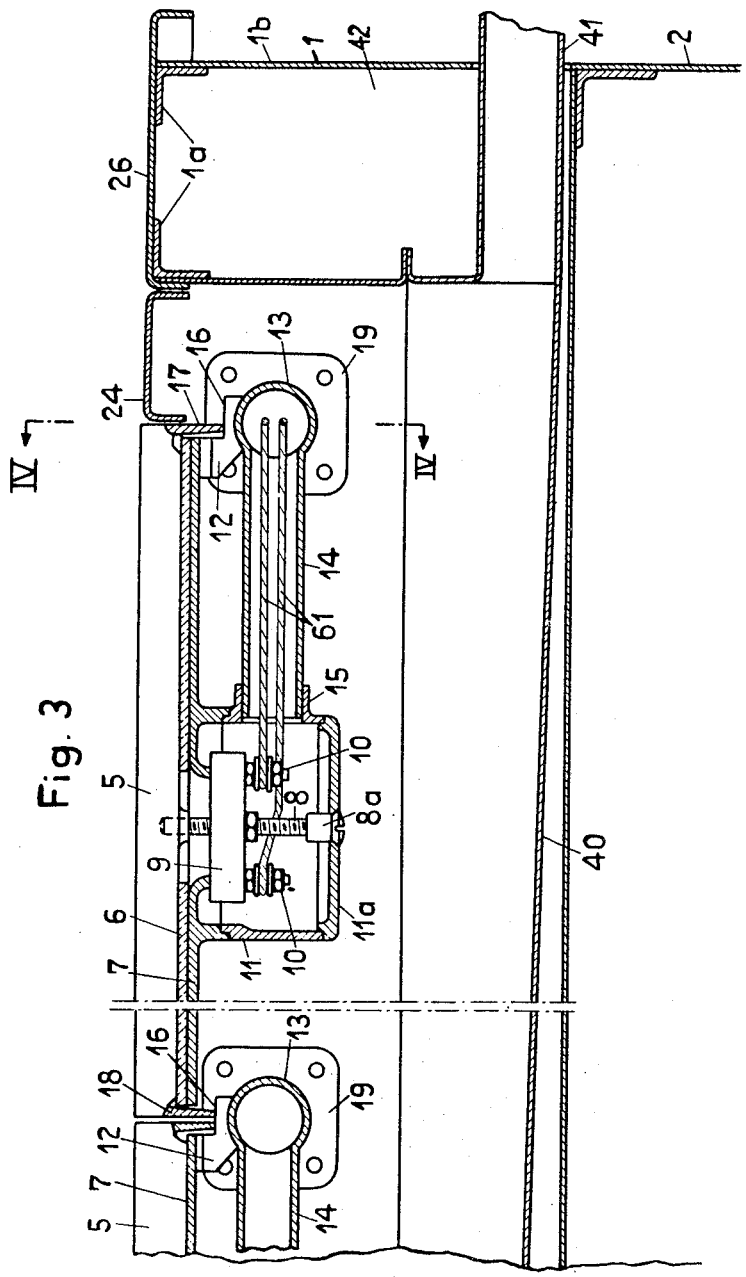

Aug. 28, 1956     O. LOCHER     2,761,054
ELECTRIC COOKER FOR LARGE KITCHENS
Filed Dec. 24, 1953     6 Sheets-Sheet 4
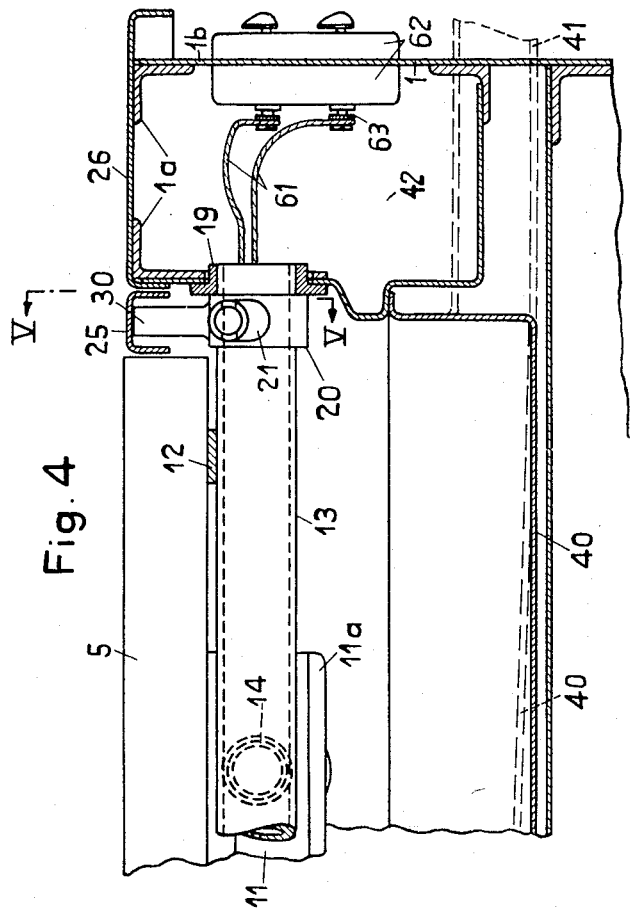
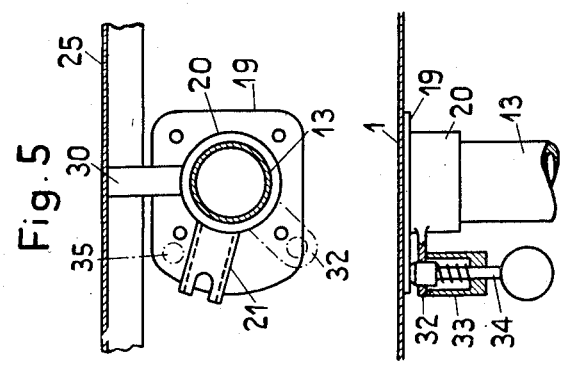
INVENTOR
OSKAR LOCHER
Greene, Pineles & Durr
ATTORNEYS Aug. 28, 1956     O. LOCHER     2,761,054
ELECTRIC COOKER FOR LARGE KITCHENS
Filed Dec. 24, 1953     6 Sheets-Sheet 5
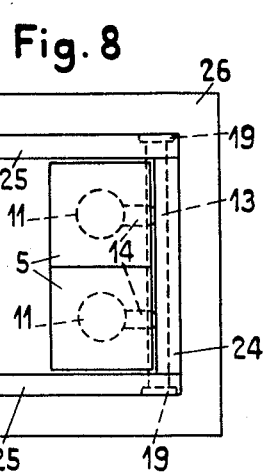
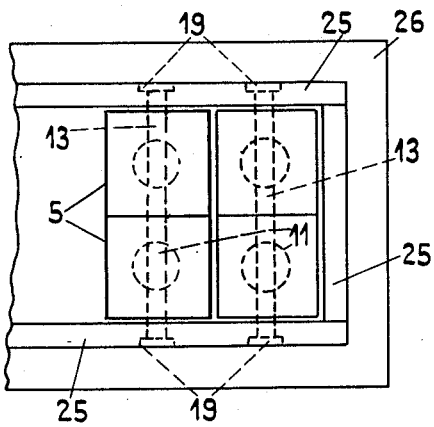
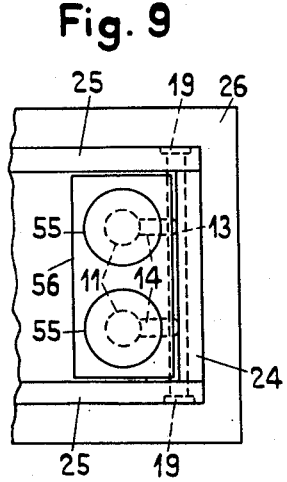
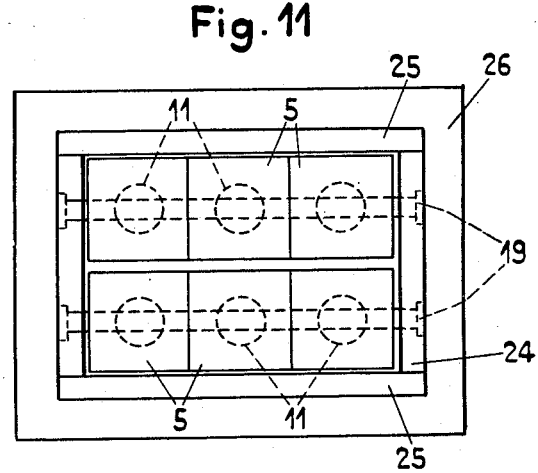
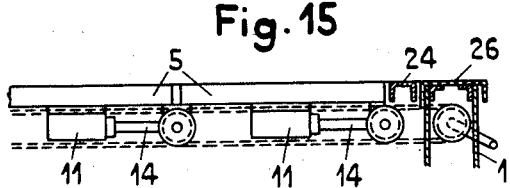
INVENTOR
Oskar Locher
Greene, Pinella & Durr
ATTORNEYS Aug. 28, 1956  O. LOCHER  2,761,054
ELECTRIC COOKER FOR LARGE KITCHENS
Filed Dec. 24, 1953  6 Sheets-Sheet 6
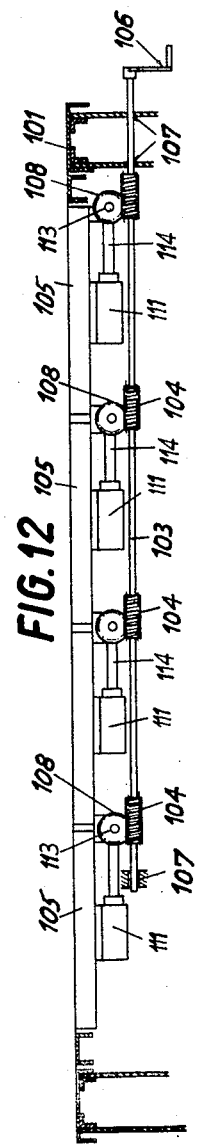
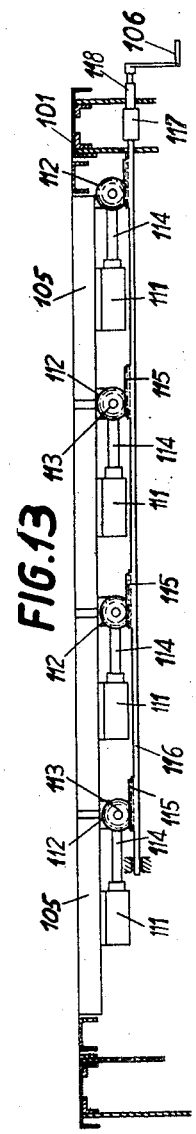
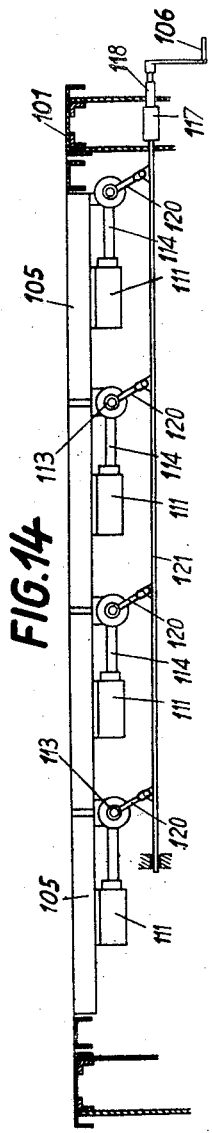
INVENTOR
OSKAR LOCHER
ATTORNEYS United States Patent Office 2,761,054
Patented Aug. 28, 1956

2,761,054

ELECTRIC COOKER FOR LARGE KITCHENS

Oskar Locher, Zurich, Switzerland

Application December 24, 1953, Serial No. 400,221

Claims priority, application Switzerland January 8, 1953

7 Claims. (Cl. 219—37)

The invention relates to electric cookers for large kitchens.

Electric cookers are used more and more in hospitals, restaurants, hotels, canteens, institutions, military barracks etc. and have since become as popular there as electric cookers have been in households for a long time. In developing the design of household cookers it was of paramount importance to afford as perfect as possible a facility for cleaning the cooker, particularly in the sense of being able to easily remove any material which has boiled over, so that the cooker can be kept spotlessly clean.

While this condition is practically fulfilled with household cookers, this is not the case with cookers for large kitchens, of the usual design. The reason for this is that as distinguished from household cookers the large and heavy hot plates of cookers for large kitchens can not be simply taken out of and re-inserted into ordinary plug-and-socket connectors because plug-and-socket connectors would wear out comparatively soon at the current intensities and temperatures occurring here, and would require repairs. For this reason, in the usual design the large hot plates of this kind of cookers, which mostly have a diameter of 12" or 16", are fixedly screwed by means of terminals to the supply leads from the control switches, and the plates themselves are fixedly held in their horizontal position on the stove by means of screws. They can be taken out by skilled labour only because the electric connections have to be disconnected first.

Although dirt collector trays are built in below the plates for catching overboiling material it has practically never been possible to catch all overboiling material, part of which always remains in the cooker below the plates and may accumulate there to form considerable deposits which are very unhygienic.

There are already systems in which the dirt trays have been replaced in such a manner that below the hot plates a trough with a drain is arranged through which the overboiling material passes into a collector pipe which can be rinsed with water. However even in this system the hot plates are fixed, and the operator of the cooker is never certain whether or not remnants of the overboiled material still stick below the plates and form accumulations of dirt there.

It is the main object of the present invention to provide an electric cooker for large kitchens in which the space below the hot plates is readily accessible for inspection and cleaning.

It is another object of my invention to provide an electric cooker for large kitchens in which the electric leads to the hot plates are well protected from contact with the water used for cleaning the cooker, and in which any danger of electric shocks to the cleaning personnel is excluded.

It is yet another object of my invention to provide an electric cooker for large kitchens in which all hot plates can be moved out of the way for cleaning simultaneously by a single operation.

With these and other objects in view I provide an electric cooker for large kitchens comprising in combination: an upper frame portion, at least one hollow axle pivoted on the said frame portion, a carrier tiltably mounted on the said hollow axle, at least one hot plate supported by the said carrier, and electric leads to the said hot plate located within the said hollow axle and carrier.

The said hollow axle or axles may be arranged in, or transversely to, the longitudinal direction of the cooker.

Preferably a casing, forming part of the said carrier is provided, which encloses and effectively seals the electrical terminals on the underside of the said hot plate from the environment. A tube laterally connecting the said hollow axle with the said casing may be provided, through which the said electrical leads are passed from the said hollow axle to the said terminals. Two or more hollow axles may be pivoted about parallel horizontal axes and a projection on one of these hollow axes may support a hot plate mounted on an adjacent hollow axle.

A plurality of hot plates may be arranged in bays, and one hollow axle may be common to at least two hot plates arranged in a bay, the said bay being tiltable about the said axle.

Automatic arrester means arresting a hot plate in its tilted up position may be provided, preferably connected to the hollow axle thereof.

A sloping trough may be arranged underneath the said hot plates extending over their full area and having a discharge opening for overboiling material and rinsing water. The said trough may be sloping towards, and have its discharge opening on, either a longitudinal or a short side of the cooker. The said trough may be built in sections overlapping one another at different levels.

The hot plates may have turned-down edges and rest with one such edge on their associated hollow axle, and with the other on the hollow axle associated with the adjacent hot plate. The said hollow axles may alternatively be arranged with their axis below the center of their associated hot plates.

Self-locking operating means may be provided for the hot plates which permit tilting the same and automatically arrest the same in any position desired. If there is a plurality of hot plates, there are preferably self-locking operating means common to all of them permitting tilting the same simultaneously and to the same extent. These self-locking operating means may comprise a hand crank and self-locking gears, such as worm and worm wheel or a threaded spindle and tapped sleeve, operatively connecting the said crank to the said hollow axles. Alternatively the said threaded spindle may be connected to toothed racks meshing with spur gears or spur gear segments connected with the said hollow axles, or with links connected to lever arms mounted on the said hollow axles.

In order that the invention may be clearly understood and readily carried into effect, several embodiments and details thereof will now be described with reference to the accompanying drawings, in which:

Fig. 1 diagrammatically shows an electric cooker for a large kitchen in longitudinal section with the hot plates in the operative position.

Fig. 2 shows part of the cooker according to Fig. 1 with the hot plates raised up.

Fig. 3 is a partial longitudinal section of the cooker according to Fig. 1, on a larger scale.

Fig. 4 is a section on the line 4—4 of Fig. 3.

Fig. 5 is a section on the line 5—5 of Fig. 4.

Fig. 6 shows an arrester device for the raised hot plates, on the scale of Figs. 3 to 5.

Fig. 7 diagrammatically shows a cooker with a modified collector trough in longitudinal section, on the same scale as Figs. 1 and 2.

Figs. 8 to 11 show four different modifications of the arrangement of hot plates in plan view, on a smaller scale than Figs. 1 and 2.

Figs. 12 to 15 show four different modifications of the electric cooker according to Fig. 1 in diagrammatic longitudinal sections on the same scale as Fig. 1.

Referring first to Figs. 1 to 6, the upper portion 1 of the electric cooker for a large kitchen comprises a profile frame 1a and cover plates 1b. In the lower portion 2 of the cooker the usual hot ovens 3 and warming cupboards 4 are arranged. In the hot plates 5 the usual resistance coils are inserted in grooves. As will be seen best in Fig. 3, an insulating plate 6 is provided, which is pressed against the hot plate 5 by a cover plate 7. Into each plate 5 a threaded bolt 8 is fixedly screwed, on which an insulating plate 9 is mounted. The latter presses through the plate 7 the insulating plate 6 firmly against the underside of the hot plate 5. At the same time the insulating piece 9 carries the terminals 10 for the supply leads 61, which terminals project into the interior of a casing 11. The casing 11 has a lid 11a which is adapted to be firmly closed by means of a nut 8a. The plate 7 is fixedly connected through at least one connecting piece 12 with a hollow axle 13. The latter is pivoted in the upper portion 1 of the cooker and carries a tube 14, which projects into a connector socket 15 of the casing 11. The connecting piece 12 is provided with an abutment face 16 on which rests the edge 17 of the hot plate 5. As will be seen clearly in Fig. 3, the opposite edge 18 of the hot plate 5 rests on the abutment face 16 of the connecting piece associated with the adjacent hot plate. The plate 7, the casing 11 and the tube 14 between themselves form a carrier for a hot plate or a bay or series of hot plates. When there is a bay of hot plates 50, preferably each plate thereof is, however, supported (Fig. 8) individually on a hollow axle 13 by means of the aforesaid carrier. The pivoting of the hollow axle is effected in bearing shields 19, one of which is shown in Fig. 4.

Close to one end of the hollow shaft 13 a sleeve 20 is mounted to which a socket 21 is connected. Into this socket a grip bar 22 can be inserted (Fig. 1). When rocking the grip bar 22 in the direction of the arrow I, the associated hot plate or the corresponding bay of hot plates can be tilted up as will be clear from Fig. 2. Previously, however, the intermediate sheet metal covers 24 and 25 have to be removed, in order that the space between the outer covering 26 and the hot plates be cleared. Preferably two individual sheet metal covers 24 and 25 are used which supplement one another to a rectangular frame. As shown in Figs. 4 and 5, a pin 30 is attached to the sleeve 20, on which pin the sheet metal covers rest, while the sheet metal covers 24 are detachably connected to the sheet metal covers 25 in any conventional way.

On the sleeve 20 moreover an arm 32 is attached (Figs. 5 and 6) on which a snap device 33 is attached. When the hot plate is tilted up, the pin 34, which is under spring bias, snaps into a bore 35 of the bearing shield 19, and thereby secures the hot plate 5 or the whole bay of hot plates against being rocked unintentionally.

Below the hot plates 5 or bays of hot plates, a collector trough 40 is arranged which is preferably inclined, the discharge opening 41 of which is adapted to be closed. This opening is arranged either on a short side (Fig. 3) or on a long side of the cooker, as shown in Fig. 4 in dotted lines. From Fig. 2 it will be clear that the trough 40 is readily accessible and can be thoroughly cleaned when the hot plates are tilted up, and can be rinsed with a jet of water by means of a hose, if necessary.

When carrying out the cleaning operation in this manner, it is particularly important that the electric leads to the hot plates are not affected. According to the invention, the hollow axles and those parts of the carriers which lead to the insulating pieces 9 accommodate the electric leads. From Fig. 3 it will be clear that any damage to the leads is consequently made impossible, since the said leads are well protected in the components 13, 14 and 11.

Where the said leads 61 emerge from the hollow axle they are drawn into the intermediate conduit 42 (Fig. 4) in which the switches 62 as well as the bus bars 63 are arranged which latter supply the current from the main terminals to the individual switches.

For the purpose of cleaning the trough 40, firstly the sheet metal covers 24 and 25 are lifted off, then the grip bar 22 is inserted into the socket 20 of the extreme plate on the right (Fig. 1), and the latter is tilted up by rocking the grip bar 22. Then all the adjacent hot plates or bays of hot plates can be tilted up consecutively when the grip bar 22 is at any time inserted into a socket 20 and rocked. Then the associated safety devices 33 come into action one after the other. Afterwards the cleaning of the trough and of the underside of the hot plates can be effected, any danger to the cleaner personnel by the current, as well as any damage to the electric leads being practically excluded. After withdrawing the safety bolts 34, the hot plates can be restored to their normal position in the reverse sequence, and the sheet metal covers 24 and 25 can be put on.

As a rule two square hot plates, combined in a bay, are mounted on one hollow axle. When, however, round plates 55 (Fig. 9) are used, the same are screwed to rectangular frames 56 which are in turn connected to the hollow axle exactly as described.

As will be clear from the drawings, one of the edges of the hot plate or bays of hot plates is supported directly by the intermediate pieces 12 on the hollow axle 13. Naturally the arrangement could be made alternatively in such a manner that the hollow axle lies below the centers of the hot plates or bays of hot plates (Fig. 10). In this case, too, the connection of the hollow axle to the hot plates is effected through a carrier. From the drawing it will be seen that the hollow axles are disposed in the upper portion 1 of the cooker transversely to its longitudinal direction. Obviously the hollow axle or axles could be disposed alternatively in the longitudinal direction of the cooker, if desired (Fig. 11).

In Fig. 7 another embodiment of the collector trough is illustrated. The latter consists according to this embodiment, of a plurality of part-pieces which mutually overlap and have a slope towards at least one short side of the cooker. This trough, too, is adapted for being well cleansed or rinsed by a jet, without any difficulty.

As shown in Fig. 12, the hot plates 105 are tiltably mounted on the hollow axles 113. The connection of the hot plates with the hollow axles is effected by the casings 111 and the tubes 114. On each hollow axle 113 a worm wheel 108 is attached which is in constant mesh with a worm 104. All the worms 104 are mounted on a shaft 103, which runs in the longitudinal direction of the cooker, below the hot plates 105. At one side of the cooker the shaft 103 protrudes beyond the upper portion 101 of the cooker and carries a crank 106. The shaft 103 is journalled for free rotation in bearings 107. By turning the crank 106 it is possible without difficulty to tilt the hot plates 105 upwards about the hollow axles 105. Obviously all the hot plates 105 are tilted simultaneously and to the same extent. In this operation the hot plates can stay in any position desired, since the gearing 104, 108 is self-locking. The shaft 103 always runs at a right angle to the hollow axles 113, i. e. the shaft 103 need not be arranged in the longitudinal direction of the cooker, but may be disposed transversely thereto, if desired.

The embodiment according to Fig. 13 is distinguished from the one described hereinbefore in that spur gears (or spur gear segments) 112 are mounted on the hollow axles 113 instead of the worm wheels 108. Toothed racks 115 are in constant mesh with these gears 112. These toothed racks 115 are preferably connected to a single rod 116 going right through, which is mounted to be longitudinally shiftable in the upper portion of the cooker.

The rod 116 extends into a bushing 117, into which a threaded spindle 118 is screwed in a self-locking manner. By turning the crank 106 the rod 116 can be displaced to-and-fro in its longitudinal direction, whereby tilting of the hot plates 105 is effected.

As will be clear from Fig. 14, lever arms 120 are fixedly connected to the hollow axles 113. The free ends of all lever arms are linked to a push rod 121. By means of the crank 106 this push rod 121, too, can be shifted to-and-fro, whereby the tilting of the hot plates 5 is made possible. The displacing of the rods 116 or 121 could be effected otherwise than by means of the hand crank 106, if desired.

Instead of by means of worms and worm wheels, the connection between the shaft 103 and the hollow axles 113 could be established by means of chains 50 and sprocket wheels 51 (Fig. 15). In this case, too, a self-locking member, such as 104, 108 or 117, 118 of the other embodiments, is provided in order that the hot plates stay in any position desired without any further safety device.

This application is a continuation-in-part of my U. S. application Serial No. 350,690 filed April 15, 1953.

While I have described and illustrated what may be considered typical and particularly useful embodiments of my said invention, I wish it to be understood that I do not limit myself to the particular details and dimensions described and illustrated, for obvious modifications will occur to a person skilled in the art.

What I claim as my invention and desire to secure by Letters Patent is:

1. In an electric cooking stove for large kitchens, the combination comprising an upper frame portion, at least one hollow axle pivotally mounted on said frame portion, at least one hollow carrier means mounted on said hollow axle extending laterally from the central portion of said axle, with the hollow portion of said carrier means communicating with the hollow portion of the axle, a hot plate containing an electric heater element attached at the free end of said carrier means, and electrical leads within the said hollow axle and the carrier means electrically connected with the heater element of said hot plate.

2. In an electric cooking stove for large kitchens, the combination comprising an upper portion, at least two hollow axles pivotally mounted in said upper portion about parallel horizontal axes, at least two carrier means, one attached to a first of said axles and the other attached to the second of said axles, each of said carrier means carrying a substantially rectangular section which includes a hot plate containing an electrically operated heater element, the said rectangular sections together comprising substantially the entire top heating surface of said stove, a projection on one of said hollow axles supporting the edge of a hot plate pivotally supported by carrier means on an adjacent hollow axle, and electrical leads within said hollow axle and the carrier means electrically connected to the heater element of said hot plate.

3. In an electric cooking stove for large kitchens the combination comprising an upper frame portion, at least one hollow axle pivotally mounted on said hollow axle, a plurality of carrier means mounted on said hollow axle, each extending laterally therefrom in substantially the same direction, a plurality of hot plates each containing an electric heater element and each being carried by one of said carrier means whereby pivoting of the said axle simultaneously moves all of said heater elements upwardly, a sloping trough underneath said hot plates, said trough comprising separate overlapping sections at different levels and having a discharge opening at the lowest level thereof for removing waste material and rinsing water.

4. In an electric cooking stove for large kitchens, the combination comprising an upper frame portion, at least two hollow axles pivotally mounted in said upper frame portion about parallel horizontal axes, at least one hot plate comprising an electrical heater element supported by each of said axles, means mounted on said axles adapted to pivotally rotate the same, and means for simultaneously operating all of said means for rotating the axles.

5. An electric cooker for large kitchens, comprising in combination: an upper portion of the cooker, at least two hollow axles pivoted on the said upper portion about parallel horizontal axes, at least one hot plate having turned-down edges parallel to the said hollow axles mounted tiltably on each of the said hollow axles, one of the said turned-down edges resting on the hollow axle associated with the said hot plate, and the other one of the said turned-down edges resting on the adjacent hollow axle, and electric leads to the said hot plates located within the said hollow axles.

6. An electrical cooker as set forth in claim 4 wherein the means for simultaneously operating all of said means for rotating the axles comprises a hand crank and gears operatively connecting the said crank to said hollow axles.

7. An electrical cooker as set forth in claim 4 wherein the means for simultaneously operating all of said means for rotating the axles comprises a hand crank, a push rod operatively connected to the said crank, and rocker levers connected to the push rod and to said hollow axles.

References Cited in the file of this patent

UNITED STATES PATENTS

| | | |
|---|---|---|
| 1,174,367 | Vogel | Mar. 7, 1916 |
| 1,484,170 | Cannon | Feb. 19, 1924 |
| 1,709,664 | Forshee | Apr. 16, 1929 |
| 2,152,261 | Kahn | Mar. 28, 1939 |
| 2,292,735 | Besocke | Aug. 11, 1942 |
| 2,367,626 | Shroyer et al. | Jan. 16, 1945 |
| 2,417,977 | French | Mar. 25, 1947 |

FOREIGN PATENTS

| | | |
|---|---|---|
| 988,924 | France | Sept. 3, 1951 |